ively made dough articles.
United States Patent Office 2,989,809
Patented June 27, 1961

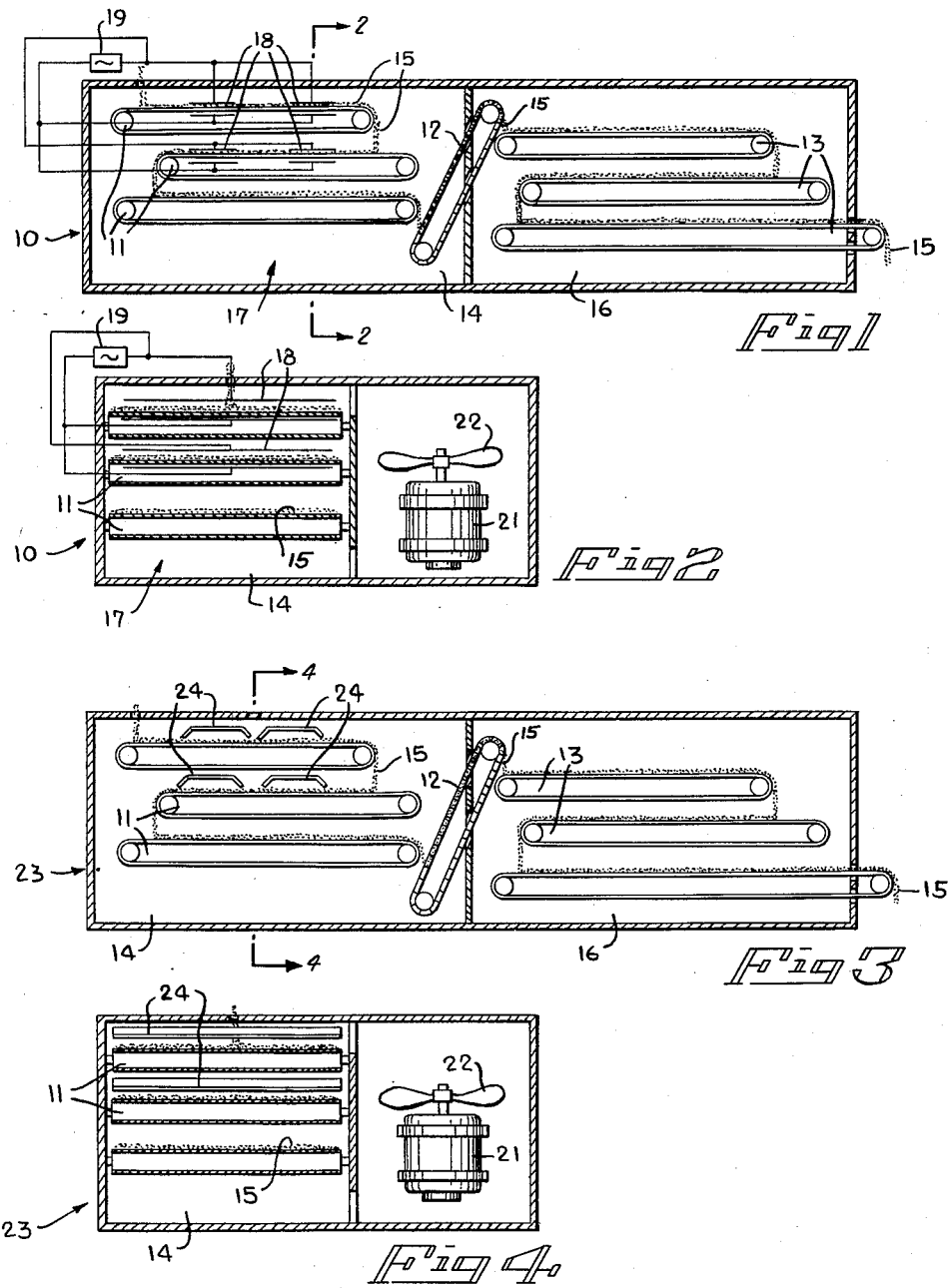

2,989,809
METHOD FOR THE FINISHING TREATMENT OF DOUGH PRODUCTS
Erwin Kurz, Schorndorf, Germany, assignor, by mesne assignments, to Schwaben-Nudel-Werke, B. Birkel Sohne, Endersbach, Germany, a German company
Filed Apr. 12, 1954, Ser. No. 422,653
In Germany Oct. 1, 1948
Public Law 619, Aug. 23, 1954
Patent expires Oct. 1, 1968
4 Claims. (Cl. 34—28)

The invention relates to a method for finishing the treatment of dough products.

Dough products originating from the shaping press are dried prior to their introduction into commerce whereby a substantial load reduction results.

From economical and other reasons it is desired to perform the drying process as quickly as possible; on the other hand quick drying leads to the formation of cracks in the finished products; moreover, quickly dried dough articles assume an unattractive color, their taste is impaired and their cooking quality is reduced.

As a consequence thereof a quick drying of the freshly prepared dough products has been up to date practically impossible and long drying periods of twenty-four hours and more had to be accepted by the art. This long drying time not only causes economical disadvantages but impairs the taste and the appearance of the dough products.

It is the main object of the invention to eliminate these disadvantages of the customary drying methods for fresh- It is a further object of the invention to create uniformity of the drying conditions and to thereby produce dough products of a wonderful yellow color, which are free of cracks, have a very good taste and excellent cooking properties.

With this object in view the dough products coming from the shaping press are subjected to an accelerated drying treatment whereby an intensified drying is effected at the surface of the articles relative to the interior portion thereof; these products are moistened directly before, during or directly after the drying with air having a relative high moisture content. An air containing 50 to 85 percent moisture and having a temperature of 70 to 100 C. is preferably used for this quick drying step.

The drying may also be effected by a combined infrared and/or high-frequency ray treatment and air drying procedure or by an infrared or high frequency ray treatment exclusively.

The infrared treatment may also be combined in a satisfactory manner with the air drying step, which latter may be carried out in several steps at different temperatures and with air having relatively different moisture contents. However, care must be taken that the air used for the drying as well as the moistening of the dough products uniformly and allsidedly contacts the individual dough particles.

In order to secure the above identified procedure it is advisable to create during the drying step positional changes of the dough products which are generally located upon bands or hurdles. This object may also be attained by throwing the dough products from one band onto another or several other bands.

The dough products are subjected upon their release from the shaping press to a combined surface drying and moistening action; the moistening may take place before the drying action, during the same or immediately after it. By this moistening step which is inserted into the drying procedure an accumulation or reaccumulation is produced of the water in the outer layer of the dough products. In this manner the moisture gradient may be controlled in the dough products and adapted to the temperature gradient which results during drying; strains and stresses which may be created during the drying step, may be reduced or eliminated thereby and a welcome structure homogeneity obtained throughout the goods. It also may well be that by the moistening step other inner structural changes are produced which improve the homogeneity of the products. In this direction it may be of interest to note that the diffusion speed of the water in the dough products changes with the different moisture contents thereof. It was found that particularly high air speeds are not required in the performance of the instant dough drying process as they may necessitate high costs for the ventilator use. Speeds, which are beneath 1 m./second fully serve the instant purposes. The dough articles may be stacked on bands or other suitable supports up to a height of 5 to 10 centimeters and more.

*Example*

Dough products coming from the press and located on a suitable support, such as a band, are for the purposes of drying the same contacted with drying air having a moisture content of 70 to 85 percent at a temperature of about 70 to 100° C.; this air contact is continued until the goods have reached a weight which equals to about 85 percent of its initial weight. The drying procedure is continued with air having a moisture content of 50 to 70 percent and at a temperature of about 30 to 70° C. until the weight of the articles is reduced to about 80 percent of the initial weight.

The dried goods are now subjected to a moistening treatment; for this purpose the goods are treated with air having a moisture content of between 80–100 percent and a temperature of about between 50 to 100° C.

During this moistening treatment step, the length of which may be adapted to the character of the goods, a weight increase takes place which may be up to 4 percent or more.

The moistening treatment is interrupted as soon as the articles have reached the desired moisture content of, for instance, about 13 percent. In spite of the weight increase the remoistening represents a means whereby the total drying time is reduced, as it permits the use of a primarily high drying temperature, whereby the drying air having a relatively high moisture content may have a temperature of 100° C. and slightly more.

If lower drying temperatures are used it is advisable to use during the moistening step a somewhat lower moisture content of, for instance, 70 percent.

The drying phase of the instant process may be improved by the insertion into the same of a plurality of moistening steps. The moistening of the dough products may be controlled in such a manner that a temperture is maintained of about 50 to 105° C. and a relative air moisture of 80 to 100 percent.

It is also advisable to subject the dough products during the drying and moistening phases to positional changes whereby a more uniform air supply is secured.

The drying may be carried-out at an air speed of less than 1 m./sec.

In the accompanying drawings:

FIG. 1 is a schematic longitudinal sectional view of a drier in accordance with an embodiment of the invention;

FIG. 2 is a schematic sectional view taken on the line 2—2 of FIG. 1;

FIG. 3 is a schematic sectional view, similar to FIG. 1, but embodying a modification; and FIG. 4 is a schematic sectional view, similar to FIG. 2, but embodying the modification of FIG. 3 and taken on the line 4—4 of FIG. 3.

In the drier 10 of FIGS. 1 and 2, the dough products or goods 15 are carried on band conveyors 11, 12 and 13 through two adjoining compartments 14 and 16, respectively, of a drier housing 17. In the first compartment 14 there are disposed high frequency current electrodes 18 that are fed from an electric source 19. The goods pass between the electrodes 18 for drying. A motor 21 drives a fan 22 to circulate the drying air.

The drier 23 of FIGS. 3 and 4 is similar to the drier 10 described in the foregoing, except that infrared light reflectors 24 replace in the compartment 14 the electrodes 18.

Since certain changes in carrying out the above invention could be made without departing from the scope thereof, it is intended that all matter contained in the above description shall be interpreted as illustrative and not in a limiting sense.

I claim:

1. A method for applying a finishing treatment to dough products upon their release from a shaping press comprising subjecting said products to a surface drying action in such a manner that an intensified drying results at the surface of said products relative to the inner portion thereof and combining with said drying action a moistening step with moist air, the air having a temperature of 70 to 100° C. and a moisture content of 50 to 85 and up to 100 percent relative humidity.

2. In a method according to claim 1, maintaining during the moistening action a temperature of the moistening agent of about 50 to 105° C. and a relative humidity of about 80 to 100 percent.

3. A method for applying a finishing treatment to dough products upon their release from a shaping press, comprising the steps of subjecting said products to a surface drying action in such a manner that an intensified drying results at the surface of said products relative to the inner portion thereof and combining with said drying action at least one moistening step with moist air, the air for said surface drying action having a temperature of from 70° to 100° C. and a moisture content of from 50 to 85 and up to 100 percent relative humidity, preceding the moistening action with two drying steps of which the first is carried out with dry air at a temperature of from 70° to 100° C. and having a relative humidity of from 50 to 100 percent, whereas the air temperature during the second drying step is maintained at from 30° to 70° C. and the relative humidity at about from 50 to 85 percent.

4. In a method according to claim 3, the step of controlling the drying during the first drying step until a weight results of about 85 percent of the original wet weight and in the second drying step of about 80 percent of the wet weight of the goods released from the press, and controlling the moistening treatment following the drying step to reach about 83 percent of the wet weight.

References Cited in the file of this patent

UNITED STATES PATENTS

| | | |
|---|---|---|
| 1,822,313 | Quiggle et al. | Sept. 8, 1931 |
| 2,074,458 | Cavagnaro | Mar. 23, 1937 |
| 2,466,130 | Surico | Apr. 5, 1949 |
| 2,552,120 | Scotland | May 8, 1951 |